United States Patent [19]

Stange

[11] 3,714,112

[45] Jan. 30, 1973

[54] GLYCIDYL ACETATE AS VISCOSITY MODIFIER FOR LIQUID EPOXY RESINS

[75] Inventor: Hugo Stange, Princeton, N.J.
[73] Assignee: FMC Corporation, New York, N.Y.
[22] Filed: April 15, 1971
[21] Appl. No.: 134,441

[52] U.S. Cl. ................................ 260/30.4 EP
[51] Int. Cl. ................................ C08g 51/32
[58] Field of Search ............ 260/30.4 EP, 348 A

[56] References Cited

UNITED STATES PATENTS 2,528,932   11/1950   Wiles et al. ............. 260/30.4 EP X

FOREIGN PATENTS OR APPLICATIONS 983,516   2/1965   Great Britain .............. 260/30.4 EP

*Primary Examiner*—Lewis T. Jacobs
*Attorney*—Robert D. Jackson, Eugene G. Seems and Pauline Newman

[57] ABSTRACT

A fluidized resinous composition comprising (1) a liquid epoxy resin and (2) glycidyl acetate as a viscosity control agent therefor. Also described are the cured products formed therefrom.

4 Claims, No Drawings

GLYCIDYL ACETATE AS VISCOSITY MODIFIER FOR LIQUID EPOXY RESINS

BACKGROUND OF THE INVENTION

A. Field of the Invention

This invention relates to epoxy resins and in particular to fluidized epoxy resins having controlled viscosity.

B. DESCRIPTION OF THE PRIOR ART

In the epoxy resin art, the use of various additives for effecting modifications in resin properties is well know. For instance, diluents are blended with the resin for the purpose of reducing its viscosity characteristics. Reduced viscosity is desired to facilitate handling of the resin in such applications as casting or 100 percent solids coatings. Such diluents may be inert or they may react chemically and become part of the resin system. Reactive diluents are the most widely used and usually contain an epoxy functionality.

Although many compounds have been tested as diluents only a few are commercially important. These include glycidyl ethers such as butyl glycidyl ether, phenol glycidyl ether, diglycidyl ether of 1,4-butanediol and to a lesser extent allyl glycidyl ether. Epoxidized olefins or diolefins as exemplified by octylene oxide, dodecene oxide, styrene oxide, limonene mono and dioxides can also be used.

Another class of effective reactive diluents for epoxy resins are the glycidyl esters of which glycidyl methacrylate and the glycidyl ester of a higher tertiary carboxylic acid are among the more important members.

SUMMARY OF THE INVENTION

It has now been discovered that excellent viscosity control in an epoxy resin system can be attained with glycidyl acetate and the provision of fluid epoxy resins containing same constitutes the principal object and purpose of the invention. Other objects and purposes will become manifest subsequently.

GENERAL DESCRIPTION AND PREFERRED EMBODIMENT(S) (s)

In carrying out the invention, glycidyl acetate and the liquid epoxy resin are blended together and the resulting resin mixture retained until ready for curing. The amount of glycidyl acetate used is from about 1.0 percent to about 25.0 percent by weight based on the weight of resin. Commonly the concentration is about 10 percent.

The resin mixture is cured in the usual manner using known curing agents such as polyamines or polycarboxylic acid anhydrides.

Epoxy resins are known substances usually formed by condensing an epichlohydrin with a compound containing active hydrogens. The polyhydric phenols are the most common in commercial practice. An especially important class of phenols contain a single carbon atom between the rings and are prepared from an aldehyde or ketone and a phenol having a free ortho or para portion. The compound, bisphenol A, having the structure

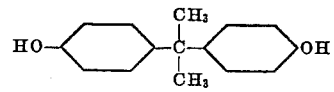

and formed by condensing acetone with phenol is a well known commercial product from which epoxy resins are manufactured. For a fuller description of epoxy resins, reference is made to the familiar treatise by Henry Lee and Kris Neville entitled "Hand book of Epoxy Resins" (McGraw-Hill, Inc. 1967).

Glycidyl acetate is a known compound which can be prepared from ketene and glycidol.

Reference is now made to the following non-limiting examples.

EXAMPLE 1

A series of mixtures of glycidyl acetate and 100 parts of diglycidyl ether of bisphenol A (Araldite 6005) were prepared. The initial viscosities of the diglycidyl resin mixtures were measured with a Brookfield viscometer at 25°C. The measured viscosities of the mixtures ranged between 8100 centipoise for 0 glycidyl acetate to 248 centipoises for 25 percent. A clear fluid mixtures resulted from which air bubbles readily separated. To 100 grams of each mixture, about 14 gram of triethylenetetramine curing agent, was added and thoroughly mixed. The mixtures were poured into casting molds 8 inches × 8 inches × ⅛ inch thick and allowed to cure overnight at ambient temperature. The samples were then cured an additional 8 hours at 100°C., cut into appropriate size for measurement of physical properties. Procedures described in ASTM D-638, D14 790 and D14 78 were used to measure tensile strength, flexural strength and Rockwell hardness, respectively. Improvements in tensile and flexure were noted with increase glycidyl acetate content. The test results are summarized in Table I.

TABLE I

[Araldite epoxy resin 6005* cured room temperature—overnight room temperature plus 8 hours at 100° C.]

| Modifier | Phr. | Brookfield viscosity | Gel time (min.) | Tensile Stress (p.s.i.) | Tensile Elong. (percent) | Tensile Modulus (p.s.i.) | Flexure Strength, p.s.i. | Flexure Modulus (p.s.i.) | Hardness, Rockwell M |
|---|---|---|---|---|---|---|---|---|---|
| Glycidyl | 0 | 8,100 | 45 | 8,776 | 1.2 | 490,000 | 10,368 | 460,000 | 112 |
| | 5 | 3,220 | 87 | 8,614 | 1.08 | 480,000 | 17,284 | 460,000 | 109 |
| | 10 | 1,272 | 85 | 9,857 | 1.48 | 490,000 | 17,163 | 470,000 | 105 |
| Acetate | 15 | 682 | 80 | 8,251 | 1.01 | 510,000 | 16,926 | 470,000 | 98 |
| | 20 | 386 | | 8,622 | 1.01 | 530,000 | 17,696 | 490,000 | 103 |
| | 25 | 248 | | 10,472 | 1.90 | 530,000 | 19,584 | 530,000 | 100 |

*Diglycidol ether of bisphenol A, a product of Ciba Products Co.; epoxy equivalent weight=182-189; viscosity, centipoises at 25° C.=7,000–10,000.

EXAMPLE 2

Using the procedure of example 1, except the resin was the higher molecular weight (Araldite 6010) having an initial Brookfield viscosity of 15,680 centipoises. After mixing with diluent, the viscosities were reduced and at 25 percent glycidyl acetate the viscosity was 308 centipoises at 25°C.

Physical properties of resin cured with triethylenetetramine showed only slight lower tensiles but flexural strength was higher with 25 parts of diluent. The results are summarized in Table II.

TABLE II

[Araldite epoxy resin 6010* cured room temperature—overnight room temperature plus 8 hours at 100° C.]

| Modifier | Phr. | Brookfield viscosity | Gel time (min.) | Tensile | | | Flexure | | Hardness, Rockwell M |
|---|---|---|---|---|---|---|---|---|---|
| | | | | Stress (p.s.i.) | Elong. (percent) | Modulus (p.s.i.) | Strength | Modulus | |
| Glycidyl | 0 | 15,680 | 40 | 9,710 | 1.40 | 490,000 | 12,694 | 460,000 | 112 |
| | 5 | 4,640 | 70 | | | | 16,680 | 440,000 | 109 |
| | 10 | 1,668 | 67 | 7,371 | 0.86 | 520,000 | 17,064 | 460,000 | 106 |
| Acetate | 15 | 840 | 60 | 7,252 | 0.84 | 520,000 | 18,076 | 470,000 | 103 |
| | 20 | 466 | 56 | 8,533 | 1.07 | 540,000 | 18,514 | 5,000,000 | 101 |
| | 25 | 308 | 53 | 8,143 | 0.84 | 550,000 | 18,508 | 5,000,000 | 101 |

*Diglycidol ether of bisphenol A (I.R. No. 4-1-10), a product of Ciba Products Co.; epoxy equivlaent weight=185-196; viscosity, centipoises at 25° C.=12,000-16,000.

What is claimed is:

1. A fluid resinous composition comprising a 1,2-epoxy resin formed by condensing epichlorohydrin with a compound containing active hydrogen and as a viscosity control agent therefor, 1.0 percent to about 25 percent based on the weight of the resin of glycidyl acetate.

2. A composition according to claim 1 wherein the 1,2-epoxy resin is the diglycidyl ether of bisphenol A.

3. A composition according to claim 1 wherein the 1,2-epoxy resin has an epoxy equivalent weight of 185–196 and a viscosity in centipoises at 25° C. of from 1,200–1600.

4. A composition according to claim 1 wherein the 1,2-epoxy resin has an epoxy equivalent weight of 182–189 and a viscosity in centipoises at 25° C. of from 7,000–10,000.

* * * * *